United States Patent
Löffler et al.

(10) Patent No.: US 6,418,365 B1
(45) Date of Patent: *Jul. 9, 2002

(54) SYSTEM FOR REGULATING A GEAR TRANSMISSION RATIO

(75) Inventors: Jürgen Löffler, Winnenden; Martin-Peter Bolz, Oberstenfeld; Holger Hulser, Stuttgart, all of (DE); Bram Veenhuizen, Goirle (NL)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/367,816
(22) PCT Filed: Nov. 16, 1998
(86) PCT No.: PCT/DE98/03365
§ 371 (c)(1),
(2), (4) Date: Aug. 23, 1999
(87) PCT Pub. No.: WO99/34136
PCT Pub. Date: Jul. 8, 1999

(30) Foreign Application Priority Data

Dec. 23, 1997 (DE) .......................... 197 57 328

(51) Int. Cl.[7] ............................................. G06F 17/00
(52) U.S. Cl. .............................. 701/51; 701/54; 701/61; 701/64; 477/43; 477/115; 477/77
(58) Field of Search ........................... 701/51, 53, 54, 701/62, 64, 65, 58, 61; 477/39, 43, 47, 48, 41, 46, 120, 109, 45; 74/335, 336 R, 77, 78, 90, 115, 125

(56) References Cited

U.S. PATENT DOCUMENTS

| | | | |
|---|---|---|---|
| 4,353,272 A | * 10/1982 | Schneider et al. ............ 74/859 |
| 4,653,006 A | 3/1987 | Osanai et al. ................. 701/60 |
| 4,658,360 A | * 4/1987 | Osanai et al. ................. 701/62 |
| 4,683,779 A | * 8/1987 | Osanai et al. ................. 477/43 |
| 4,720,793 A | * 1/1988 | Watanabe et al. ............. 701/54 |
| 4,893,526 A | * 1/1990 | Tokoro ........................ 477/43 |
| 5,377,110 A | * 12/1994 | Ikeura ......................... 701/54 |
| 5,433,677 A | * 7/1995 | Petersmann et al. ........ 477/169 |
| 5,476,425 A | * 12/1995 | Shiraishi et al. ............ 477/109 |
| 5,514,046 A | * 5/1996 | Petersmann et al. .......... 477/39 |
| 5,527,231 A | * 6/1996 | Seidel et al. .................. 477/46 |
| 5,711,712 A | * 1/1998 | Graf ........................... 477/121 |

FOREIGN PATENT DOCUMENTS

| | | |
|---|---|---|
| DE | 2848595 | 5/1980 |
| DE | 4235881 | 4/1994 |

* cited by examiner

*Primary Examiner*—Jacques H. Louis-Jacques
(74) *Attorney, Agent, or Firm*—Walter Ottesen

(57) ABSTRACT

The invention proceeds from a system for adjusting a motor vehicle transmission, which is changeable in its transmission gear ratio, the transmission having an efficiency characteristic which is dependent on the transmission gear ratio. A first quantity is detected which represents the actual transmission output rpm and a second quantity is determined which represents a desired value for the drive torque. Then, a desired rpm of the vehicle engine is determined at least in dependence upon the detected first quantity and the determined second quantity and in dependence upon the efficiency characteristic of the transmission. The adjustment of the transmission gear ratio takes place in dependence upon the desired rpm of the vehicle engine which is so determined. With the invention, transmission influences are considered in the determination of the optimal transmission gear ratio within a system for the coordinated drive train control. The advantage, which results from the above, is the basic possibility to better adapt the drive train to the requirements by optimizing the total efficiency, the torque reserve and other optimizing criteria.

6 Claims, 6 Drawing Sheets

SYSTEM FOR REGULATING A GEAR TRANSMISSION RATIO

FIELD OF THE INVENTION

The invention relates to a system for adjusting a transmission gear ratio.

BACKGROUND OF THE INVENTION

From the state of the art, many possibilities are known to adjust the gear ratio of a motor vehicle transmission to adjust a specific desired rpm of the vehicle motor. In U.S. Pat. No. 4,893,526, a desired output torque is determined from the vehicle longitudinal speed and the position of the accelerator pedal actuated by the driver. Thereupon, a desired value for the engine rpm is determined in dependence upon the desired output torque and the vehicle longitudinal speed. This desired value for the engine rpm is controlled by the adjustment of a continuously variable vehicle transmission. Furthermore, the desired output torque as well as the adjusted transmission gear ratio are applied to adjust the engine torque.

WO 95 20114 A discloses a control for an automatic motor vehicle transmission wherein the engine rpm is intended to be adjusted to the region of optimal efficiency, minimal exhaust-gas emission or maximum power via a fuzzy logic control circuit by a continuous control of the transmission ratio. Here, the efficiency of the vehicle engine is of primary concern. The influence of the transmission efficiency on the total efficiency of the drive train is not considered.

SUMMARY OF THE INVENTION

The object of the present invention is to adapt the engine rpm optimally to the particular driving situation or the particular driving state. This engine rpm can be controlled by an adjustment of the transmission gear ratio.

The invention proceeds from a system for adjusting a motor vehicle transmission which is changeable in its transmission gear ratio. The transmission has an efficiency characteristic which is dependent upon the transmission ratio. A first quantity, which represents the actual transmission output rpm, is detected as well as a second quantity, which represents a desired value for the drive torque. A desired rpm of the vehicle engine is determined at least in dependence upon the detected first quantity and the determined second quantity and in dependence upon the efficiency characteristic. The adjustment of the transmission ratio takes place in dependence upon the desired rpm of the vehicle engine which is so determined.

For a drive torque wanted by the driver, an optimal transmission ratio and the required engine output torque are determined via a coordinated drive train control. The components "engine" and "transmission" of the drive train are correspondingly driven so that the required drive torque is made available. The invention permits a systematic consideration of the transmission efficiency for the determination of the optimal transmission ratio. In this way, a maximization of the total efficiency of the drive train is achieved for an optimal vehicle operation. The advantage resulting therefrom is the basic possibility to better adapt the drive train to the requirements via optimization of the total efficiency, the torque reserve and/or other optimization criteria.

It is especially advantageous when the determination of the desired rpm of the vehicle engine takes place in such a manner that a desired rpm is determined for the combinations of the detected first and the determined second quantities. For this desired rpm, at least one vehicle engine parameter (such as fuel consumption, torque reserve and/or exhaust-gas emission) is optimized in the sense of a minimum or maximum.

The determination of the desired rpm can take place by means of at least one characteristic field.

Advantageously, the torque amplification characteristic and/or the efficiency characteristic of the transmission for different transmission gear ratios are applied to determine the desired rpm of the vehicle engine or for determining the characteristic field.

The torque amplification and/or efficiency characteristics can, in general, include the torque amplification and/or the efficiency of the transmission in dependence upon the first and second quantities. Here, the torque amplification and/or efficiency characteristics are advantageously in the form of characteristic fields.

Especially for a transmission, which is continuously variable with respect to its transmission ratio, it is provided that the determination of the desired rpm of the vehicle engine or the determination of the characteristic field takes place in such a manner that the corresponding torque amplifications and/or efficiencies of the transmission are determined from the existing characteristic fields of the transmission (torque amplification and/or efficiency characteristics) for different transmission ratios. An interpolation is then made between these determined torque amplifications and/or efficiencies.

In an especially preferred embodiment of the invention, it is provided that the parameter of the vehicle engine, which is to be optimized, is present as an engine characteristic field in dependence upon at least the engine rpm and the engine output torque. The procedure according to the invention is then as follows:

For different transmission gear ratios, the corresponding torque amplifications and/or the corresponding efficiencies are determined to different first and second quantities by means of the torque amplification and/or efficiency characteristics. The engine output torques, which belong to the first quantity, are determined for the different transmission gear ratios while considering the determined corresponding torque amplifications and/or the corresponding efficiencies. Values of the parameter to be optimized are determined by means of the present engine characteristic field and the values determined in this manner are applied for the determination of the desired rpm of the vehicle engine.

The second quantity, at least in pregiven operating states, is preferably determined in dependence upon a quantity which represents the position of the accelerator pedal actuated by the driver. The vehicle engine parameter, which is to be optimized, can be designed so as to be selectable.

BRIEF DESCRIPTION OF THE DRAWINGS

The invention will now be described with reference to the drawings wherein.

DESCRIPTION OF THE PREFERRED EMBODIMENTS OF THE INVENTION

The invention will now be explained with respect to the embodiment to be described in the following.

Figure 1:
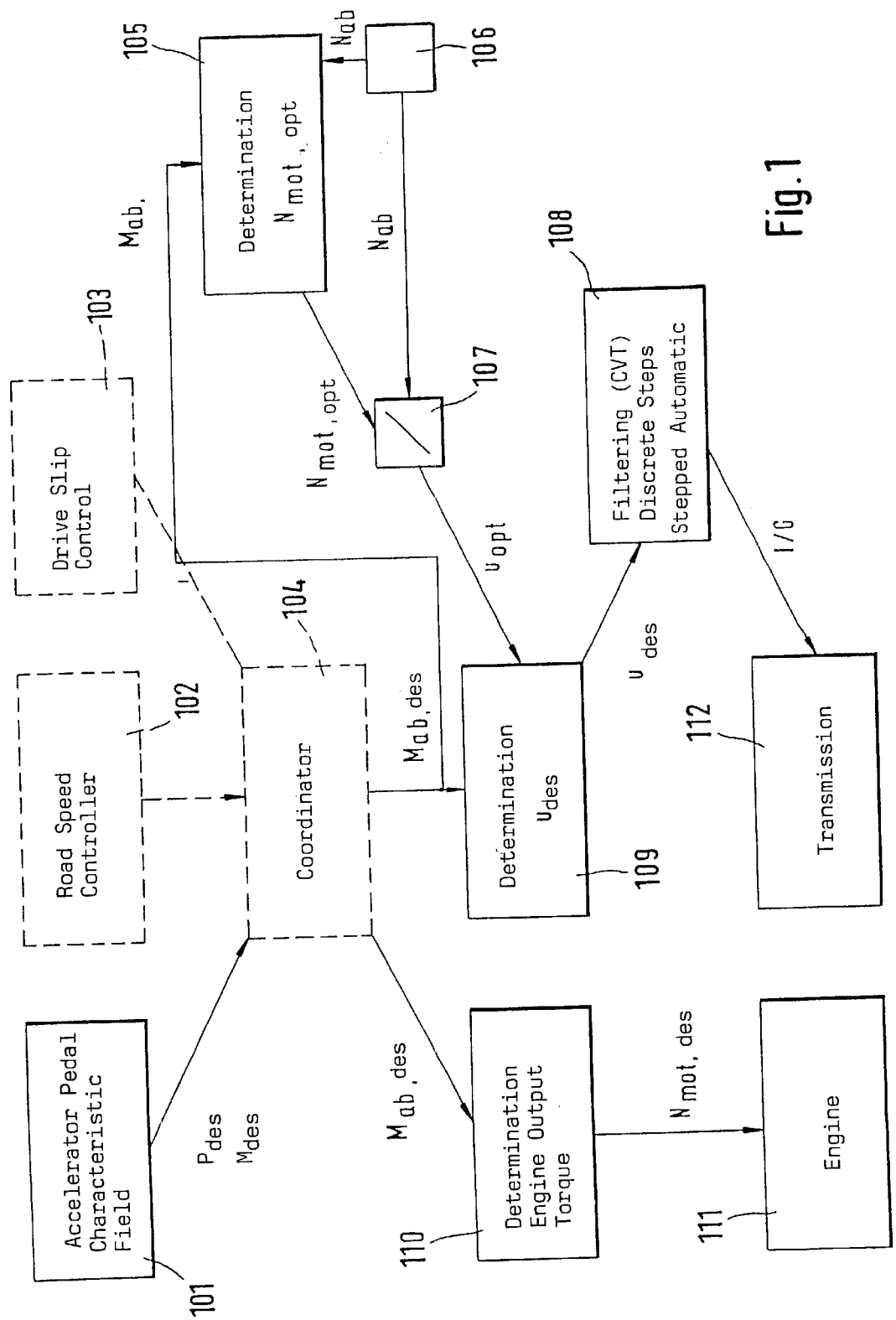
FIG. 1 shows an overview block function diagram of a coordinated drive train control.

With block 101, FIG. 1 shows the determination of a desired value $P_{des}$ and $M_{des}$ for the drive power and drive torque, respectively. This desired value is determined essentially directly or indirectly (for example, by means of a characteristic field or by means of an algorithm) from the position of the accelerator pedal actuated by the driver. A road speed controller and a drive slip control system are characterized by the blocks 102 and 103 and these blocks are optional. These systems can modify the desired value pregiven by the driver to adjust a specific vehicle longitudinal speed and/or to prevent an excessive drive slip. This modification takes place in the coordinator 104. The coordinator 104 supplies, at the output end, a desired value $M_{ab,des}$ for the drive torque. In the simplest case, the driver directly issues the desired output torque $M_{ab,des}$ via the accelerator pedal.

This desired value for the output torque is processed in block 110 to an engine torque desired value $M_{mot,des}$ and is adjusted at the engine 111. In block 109, the desired transmission ratio $u_{des}$ is determined, inter alia, in dependence upon this desired output torque command $M_{ab,des}$. The corresponding desired transmission ratio $u_{des}$ is supplied to the transmission and/or to the transmission control 112 directly or indirectly (block 108) for adjustment. The block 108 describes a conventional filtering for a continuously variable transmission or, in the case of a stepped-automatic transmission, provides a stepwise adjustment of the desired transmission gear ratio $u_{des}$ in the form of discrete steps.

In block 105, and as a major point of the invention, an optimal engine rpm $N_{mot,opt}$ is determined in a manner to be described hereinafter. In block 107, this value is processed via division by the output rpm $N_{ab}$ (rpm sensor 106) to an optimal transmission ratio $u_{opt}$ and supplied to the described unit 109.

Figure 2:
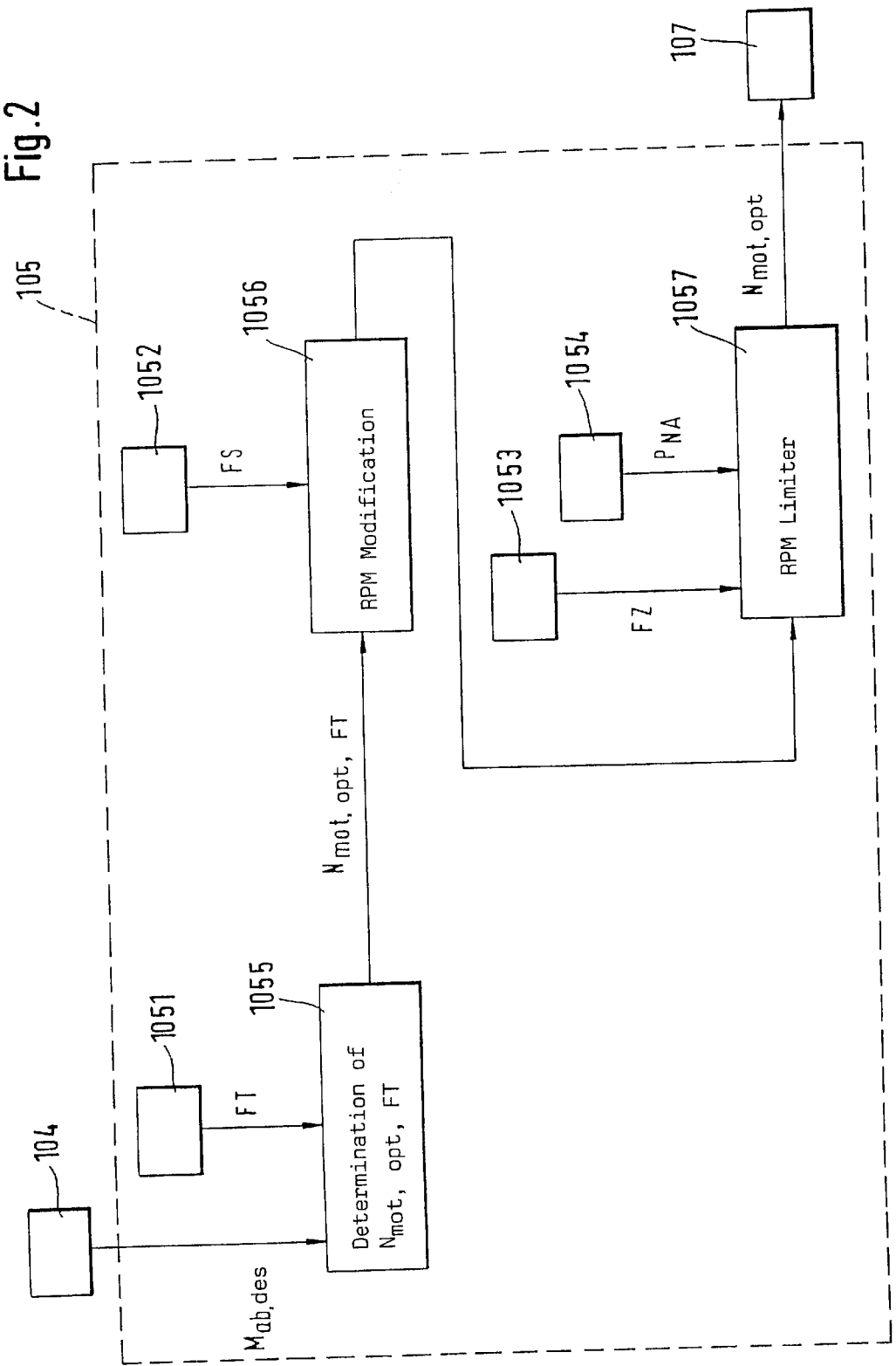
FIG. 2 shows a more precise function of block 105 of FIG. 1.
Figure 3:
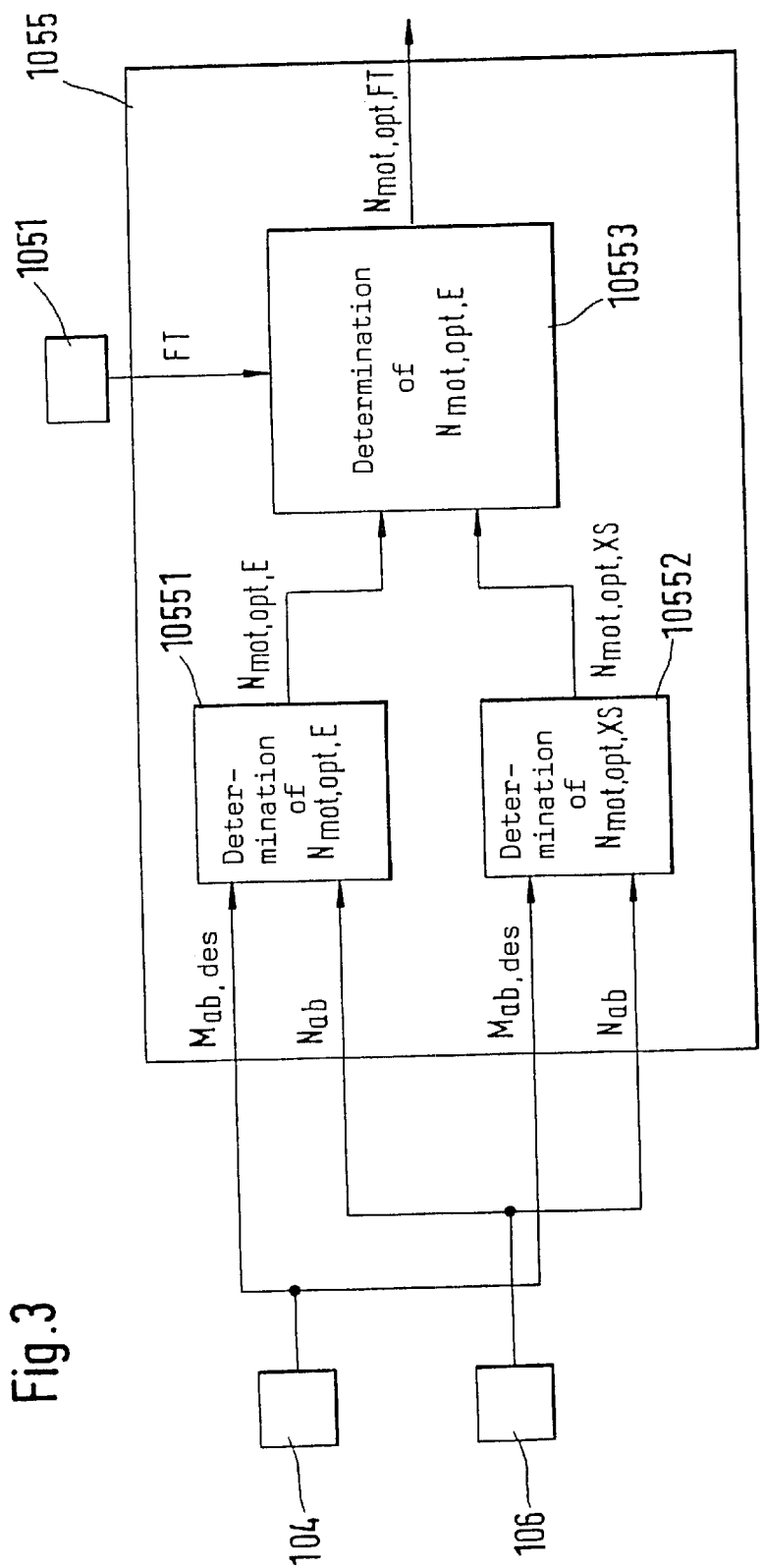
FIG. 3 shows a more precise function of block 1055 of FIG. 2.

FIG. 2 shows the more precise function of block 105 of FIG. 1. For this purpose, an optimal engine rpm $N_{mot,optFT}$ is formed in block 1055 in dependence upon the type of driver, determined in block 1051, and optionally, in dependence upon the drive command $M_{des}$ (block 104) pregiven by the driver. As already mentioned, the value FT is formed in block 1051 and represents the type of driver and/or the characteristic of the driver. For this purpose, especially the position of the accelerator pedal actuated by the driver and especially the time-dependent behavior are evaluated. FIG. 3 will now first be discussed with respect to the transfer characteristic of block 1055.

In this embodiment, and to determine the optimal engine rpm $N_{mot,opt}$ (105), engine rpms $N_{mot,optE}$ and $N_{mot,optXS}$ are formed in block 1055 for a consumption-optimal vehicle operation and for a driving power orientated vehicle operation (blocks 10551 and 10552 in FIG. 3). It is understood that also other or further engine rpms, which are optimized with reference to other parameters (for example, exhaust-gas emission), can be determined. Furthermore, any number of additional stages between a very consumption-optimized engine rpm and a very driving power optimized engine rpm are possible.

In block 10553, one of the engine rpms, which are determined in blocks 110551 and 10552, is selected as desired engine rpm $N_{mot,opt,FT}$ in dependence upon the type of driver and/or driving state. The type of driver was determined in block 1051.

The determination of the desired engine rpms $N_{mot,optE}$ and $N_{mot,optXS}$ can take place via characteristic fields with which desired engine rpms $N_{mot,optE}$ and $N_{mot,optXS}$ are stored in dependence upon $N_{ab}$ values and $M_{ab,des}$ values. In these characteristic fields, the consumption characteristic of the engine as well as the knowledge of the particular efficiency of the transmission are represented.

The determination of the characteristic fields can also take place via an offline-optimization computation which will be explained hereinafter. It can, however, also be provided that the determination of the engine rpm desired values $N_{mot,opt,E}$ and $N_{mot,opt,XS}$ takes place online via the optimization computation to be described hereinafter.

In addition to the characteristic fields of the transmission, the characteristic fields with the characteristic of the vehicle engine form the basis for the determinations described hereinafter. Here, first the determination of the engine rpm value $N_{mot,opt,E}$ in block 10551 is described in greater detail.

The engine rpm value is determined in block 10551 for a tupel, that is, for a value pair $(M_{ab,des}, N_{ab})$:

$$N_{mot,opt,E} = F(M_{ab,des}, N_{ab}).$$

Here, the value $N_{mot,opt,E}$ for the engine rpm is determined in such a manner that the optimal transmission gear ratio $u_{opt}$ results in such a manner that the effective fuel consumption $b_{e,eff}$ is minimal. For the determination of the values $N_{mot,opt,E}$, $U_{opt}$ is first determined for each tupel $(M_{ab,des}, N_{ab})$.

For this purpose, the transmission gear ratio u is varied in discrete steps in a range between the minimum and maximum possible gear ratios $(u_{min}, U_{max})$ $$U_{min} \leq u \leq u_{max}$$

whereby the gear ratios $u_k$ (k=1, . . . ,K) result. For transmissions, which are shifted in discrete steps, that it, for transmissions which are changeable stepwise with respect to the transmission gear ratios, it is purposeful to select as $u_k$ the gear ratio steps of the transmission gears. For transmissions, which are adjustable without steps with respect to their gear ratios, a number of values $u_k$ are to be pregiven which is adequate for the numerical precision of the result.

For each value $u_k$, the torque amplification $\mu_k$ can be determined as a function of $M_{ab,des}$ and $N_{ab}$ from the characteristic field of the transmission. In the value $\mu_k$, the efficiency $\eta_g$ of the transmission is already contained and the following applies:

$$\mu_k = u_k * \eta_g.$$

The desired air engine output torque, which is required for the torque amplification $\mu_k$, is $$M_{mot,des,k} = \frac{M_{ab,des}}{\mu_k},$$

and, the engine output rpm is:

$$N_{mot,k} = N_{ab} * u_k.$$

The power $P_{ab,des}$, which is required on the vehicle wheels in a situation, results from the product $M_{ab,des} * N_{ab}$. For the power $P_{ab,des}$, the consumption $b_{e\_t,k}$ of fuel per unit of time can be determined with the above-mentioned quantities from:

$$b_{e\_t,k} = F(M_{mot,des,k}; N_{mot,k}).$$

Figure 4:
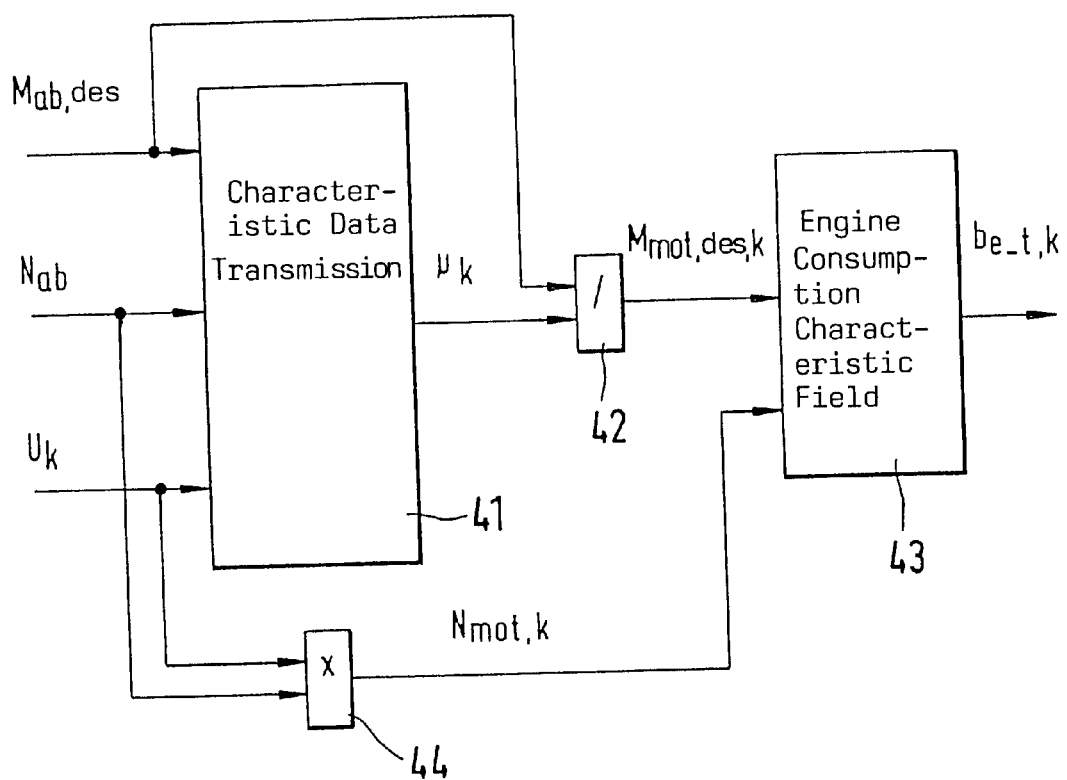
FIG. 4 is a function block diagram showing the procedure for determining the consumption $b_{e\text{-}t,K}$.

The procedure for determining $b_{e\_t,k}$ is presented in FIG. 4. For the description of FIG. 4, the block 41 (characteristic data of the transmission) will first be explained in greater detail with respect to FIG. 5.

Figure 5:
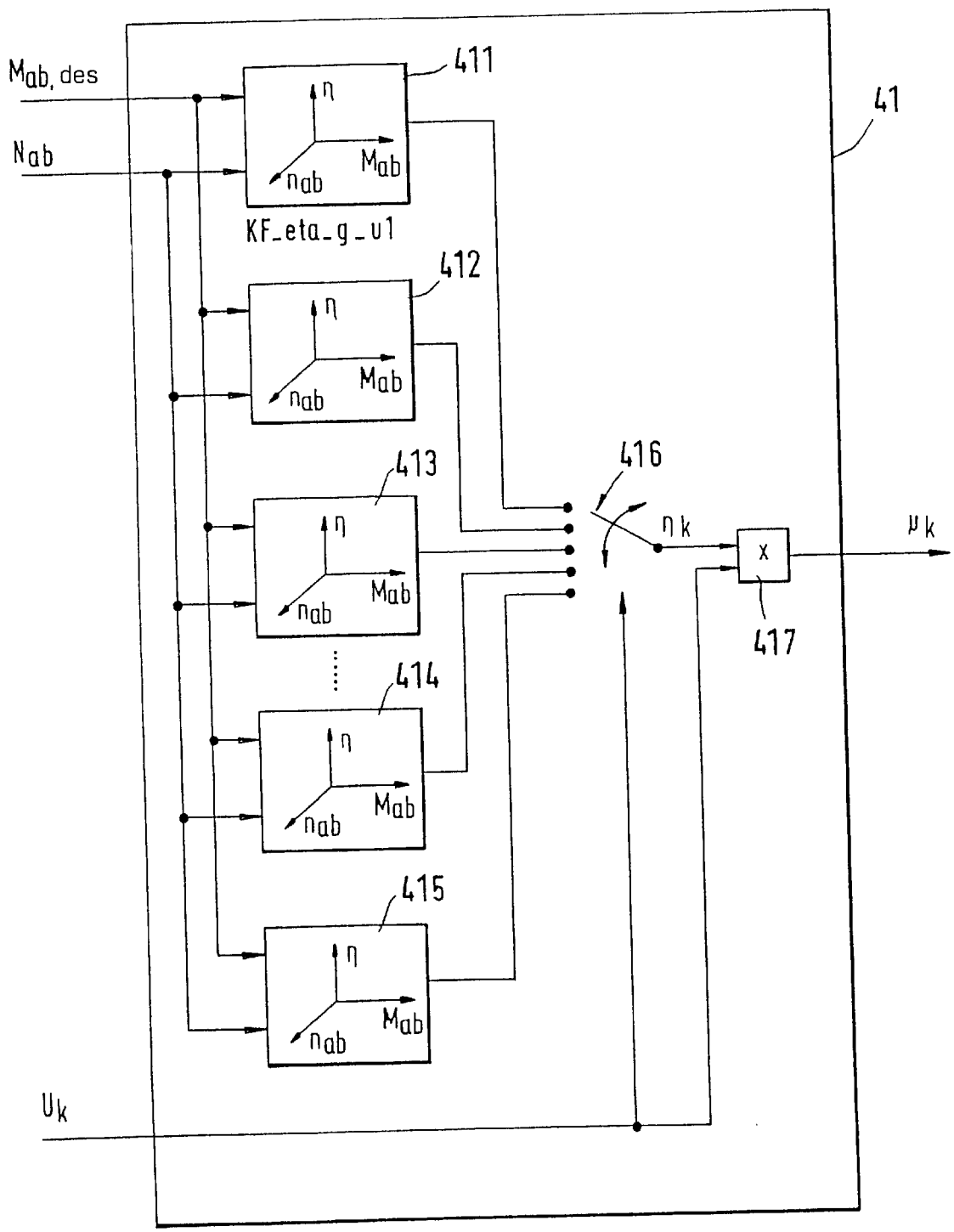
FIG. 5 shows a more precise function of block 41 of FIG. 4.

Desired values $M_{ab,des}$ for the output torque as well as values $N_{ab}$ for the transmission output rpm are supplied to the block 41 (FIGS. 4 and 5). Characteristic fields KF__eta__g__u1, . . . , KF__eta__g__uK (blocks 411 to 415) belong to each transmission gear ratio $u_1, u_2, \ldots, u_k$ and contain the efficiency characteristic of the transmission. The transmission efficiency η is stored in these characteristic fields KF_eta_g_u1, . . . , KF_eta_g_uK (blocks 411 to 415) in dependence upon the transmission of output torque $M_{ab}$ and the transmission output rpm $N_{ab}$ for different transmission gear ratios $u_1, u_2, \ldots, u_k$.

The formation of the efficiency $\eta_k$, which is relevant for the gear ratio $u_k$, takes place via the selector 416, which is shown as a switch, in dependence upon the transmission ratio $u_k$.

For continuously variable transmissions, an interpolation between two mutually adjacent values is made in lieu of the selection from discrete values for the efficiency which is shown in FIG. 5.

The torque amplification $u_k$ results from the multiplication 417 of the value $\eta_k$ for the efficiency by the particular transmission gear ratio $u_k$ which is taken into consideration.

As shown in FIG. 4, the desired engine torque $M_{mot,des,k}$, which is valid for the particular transmission gear ratio $u_k$, is determined from the torque amplification $\mu_k$ and the transmission output torque $M_{ab}$ by the division 42. The corresponding value $M_{mot,k}$ for the engine rpm is determined by means of the multiplier 44 from the particular transmission gear ratio $u_k$ and the transmission output rpm $N_{ab}$.

The values $M_{mot,des,k}$ and $N_{mot,k}$ are supplied to block 43 of FIG. 4 which contains the engine consumption characteristic field. From this, the fuel consumption $b_{e\_t,k}$ per unit of time is determined which corresponds to the input values $N_{mot,k}$ and $M_{mot,des,k}$. An engine characteristic field is shown in FIG. 6 as an example.

Figure 6:
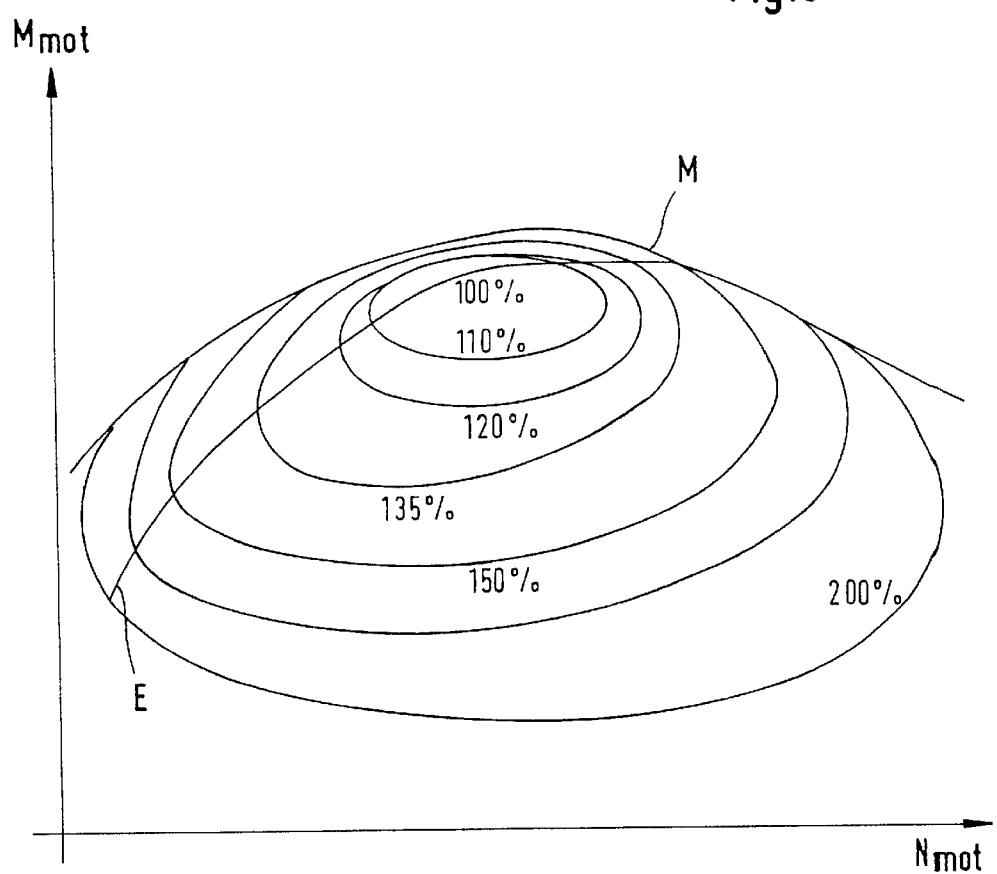
FIG. 6 shows a characteristic field of an engine.

In FIG. 6, the torque of the vehicle engine $M_{mot}$ is plotted against the engine rpm $N_{mot}$. The parameter is the specific fuel consumption, that is, the fuel consumption per unit of time. The line, which is identified by letter E, defines the optimal engine rpm for a consumption orientated driver type while considering the fuel consumption. The line for the consumption orientated type of driver passes through the point of lowest fuel consumption (100%). The letter M in FIG. 6 identifies the maximum torque which can be attained for the particular engine rpm.

The already mentioned characteristic field in block 10551 of FIG. 3 contains the engine rpm $N_{mot,opt,E}$ for each combination $M_{ab,des}$ and $N_{ab}$ wherein the fuel consumption $b_{e\_t,k}$ is a minimal per unit of time.

The optimization method, which is shown here for a minimum fuel consumption, can be carried out in the same manner also for a maximum torque reserve. The optimization criterion for the characteristic field in block 10552 of FIG. 3 is then the torque reserve $M_k$.

Further optimization criteria, such as lowest possible emissions, can also be considered with this method.

The determination of the characteristic fields 10551 and 10552 as well as further characteristic fields can also take place via the described offline optimization computation. However, it can also be provided that the determination of the engine rpm desired values $N_{mot,opt,E}$ and $N_{mot,opt,XS}$ takes place online via the described optimization computation.

As already mentioned, in block 10553 of FIG. 3, one of the formed desired values $N_{mot,opt,E}$ or $N_{mot,opt,XS}$ is selected as desired value $N_{mot,opt,FT}$ for the engine rpm in dependence upon the driver characteristic FT which is determined in block 1051.

If, as shown in FIG. 3, the engine rpm $N_{mot,opt,FT}$, which is optimal while considering the type of driver and the drive command, is found in block 1055, this engine rpm is modified in block 1056 in dependence upon the driving situation. The driving situation is determined in block 1052 in a manner known per se. In block 1057, the rpm signal, which is modified in block 1056, can be limited. It is especially provided that the limiting takes place in dependence upon the driving state (signal FZ), which is determined in block 1053 in a manner known per se, and in dependence upon the torque requirement or power requirement of the ancillary equipment (signal $P_{NA}$). The torque and/or power requirement of the ancillary equipment is determined in block 1054. The optimal engine rpm $N_{mot,opt}$, which is so determined, is supplied to the block 107 which has already been described. The basic idea of block 105 is therefore to determine an optimal engine rpm as a function of the characteristic of the driver and to then modify the latter by: the driving situation, the driving state or the torque demand of the ancillary equipment. Thus, for example for a downhill drive, a higher engine rpm can be optimal for increasing the drag torque. Additionally, for example in the warm running of the vehicle engine, the minimum rpm, which is adjusted at the engine via the transmission gear ratio, can have a higher value than for an operationally warm engine. In the same manner, for example in city driving operation, the engine rpm can be limited by the transmission gear ratio to a maximum value whereby the noise emissions and exhaust-gas emissions are reduced. In addition, an ancillary unit, for example, such as an electric generator or a climate control system can require an increased engine rpm even outside of idle which is to be adjusted by a corresponding transmission gear ratio.

With the invention, transmission influences in the determination of the optimal transmission gear ratio within a system are considered for a coordinated drive train control. The advantage resulting therefrom is the primary possibility to better adapt the drive train to the requirements by optimizing the total efficiency, the torque reserve and other optimization criteria.

What is claimed is:

1. A system for adjusting a vehicle transmission having a changeable transmission gear ratio, the vehicle transmission having an efficiency characteristic dependent upon the transmission gear ratio and being operatively connected to an engine of the vehicle, said vehicle transmission further having a torque amplification characteristic, said engine generating a drive torque and said vehicle transmission having an actual output rpm during operation thereof, the system comprising:

means for detecting a first quantity ($N_{ab}$) representing the actual output rpm of said transmission;

means for determining a second quantity ($M_{ab,des}$), which represents a desired value for the drive torque, in dependence upon a quantity which represents the position of the accelerator pedal actuated by the driver;

means for determining a desired rpm ($N_{mot,opt}$) of the vehicle engine for a combination of said detected first quantity ($N_{ab}$) and said second quantity ($M_{ab,des}$) for which at least one of the following vehicle engine parameters is optimized in the sense of being minimal or in the sense of being maximal: fuel consumption, torque reserve and exhaust-gas emission;

means for controlling the transmission gear ratio ($u_{des}$) of said transmission in dependence upon said desired rpm ($N_{mot,opt}$); and, wherein at least one of the torque amplification characteristic and the efficiency characteristic of the transmission for different transmission gear ratios ($u_k$) is applied for determining the desired rpm ($N_{mot,opt}$) of the vehicle engine or to determine the characteristic field.

2. The system of claim 1, wherein the determination of the desired rpm ($N_{mot,opt}$) takes place via at least one characteristic field.

3. The system of claim 1, wherein the torque amplification and/or the efficiency characteristics are present as characteristic fields and at least one of the torque amplification ($\mu_k$) and the efficiency ($\eta_k$) of the transmission are determined in dependence upon the first and second quantities ($N_{ab}$, $M_{ab,des}$) from the present characteristic fields.

4. The system of claim 3, wherein the determination of the desired rpm ($N_{mot,opt}$) of the vehicle engine or the determination of the characteristic fields takes place in such a manner that the corresponding torque amplification ($\mu_k$) and/or the efficiencies ($\eta_k$) of the transmission are determined from the present characteristic fields of the transmission for different transmission gear ratios ($u_k$); and, for a transmission, which is continuously variable with respect to its gear ratio, an interpolation is made between the determined torque amplifications and/or efficiencies.

5. The system of claim 1, wherein the vehicle engine parameter ($b_{e\_t,k}$), which is to be optimized, can be selected.

6. A system for adjusting a vehicle transmission having a changeable transmission gear ratio, the vehicle transmission having an efficiency characteristic dependent upon the transmission gear ratio and being operatively connected to an engine of the vehicle, said engine generating a drive torque and said vehicle transmission having an actual output rpm during operation thereof, the system comprising:

means for detecting a first quantity ($N_{ab}$) representing the actual output rpm of said transmission;

means for determining a second quantity ($M_{ab,des}$) representing a desired value for the drive torque;

means for determining a desired rpm ($N_{mot,opt}$) of the vehicle engine for a combination of said detected first quantity ($N_{ab}$) and said second quantity ($M_{ab,des}$) for which at least one of the following vehicle engine parameters is optimized in the sense of being minimal or in the sense of being maximal: fuel consumption, torque reserve and exhaust-gas emission;

means for controlling the transmission gear ratio ($u_{des}$) of said transmission in dependence upon said desired rpm ($N_{mot,opt}$); wherein said engine has an engine rpm ($N_{mot,k}$) and a parameter ($b_{e\_t,k}$) indicative of fuel consumption; and wherein the parameter ($b_{e\_t,k}$) of the engine motor, which is to be optimized, is present as an engine characteristic field in dependence upon at least the engine rpm ($N_{mot,k}$) and of the engine output rpm ($M_{mot,des,k}$); and, for different transmission gear ratios ($u_k$), the corresponding torque amplifications ($\mu_k$) and/or the corresponding efficiency ($\eta_k$) are determined to different first and second quantities ($N_{ab}$, $M_{ab,des}$) by means of at least one of the torque amplification and efficiency characteristics; and, the engine output torques ($M_{mot,des,k}$), which belong to the first quantity ($N_{mot,k}$), are determined for the different transmission gear ratios ($u_k$) while considering at least one of the determined corresponding torque amplifications ($\mu_k$) and the corresponding efficiencies ($\eta_k$); and, values ($b_{e\_t,k}$) of the parameter to be optimized are determined by means of the present engine characteristic field; and, the determined values ($b_{e\_t,k}$) are applied for determining the desired rpm ($N_{mot,opt}$) of the vehicle engine.

* * * * *